United States Patent [19]
Zeitler

[11] Patent Number: 5,391,598
[45] Date of Patent: Feb. 21, 1995

[54] POLYARYLENE SULFIDE SOLUTIONS, PROCESS FOR THE PREPARATION THEREOF AND USE THEREOF

[75] Inventor: Herbert Zeitler, Grossaitingen, Germany

[73] Assignee: Hoechst AG, Frankfurt, Germany

[21] Appl. No.: 992,593

[22] Filed: Dec. 18, 1992

[30] Foreign Application Priority Data

Dec. 20, 1991 [DE] Germany ............... 4142306

[51] Int. Cl.⁶ ........................ C08K 5/3437
[52] U.S. Cl. ...................... 524/87
[58] Field of Search ................ 524/87

[56] References Cited

U.S. PATENT DOCUMENTS

| | | | |
|---|---|---|---|
| 3,296,189 | 1/1967 | Eastman | 524/87 |
| 3,380,951 | 4/1968 | Frey et al. | 524/486 |
| 4,069,195 | 1/1978 | Layer et al. | 524/87 |
| 4,073,770 | 2/1978 | Son et al. | 524/87 |
| 5,043,112 | 8/1991 | Beck | 264/41 |
| 5,102,979 | 4/1992 | Kohler et al. | 524/95 |

*Primary Examiner*—Kriellion S. Morgan
*Attorney, Agent, or Firm*—Connolly and Hutz

[57] ABSTRACT

Solutions are described containing polyarylene sulfide and, as solvent, quinoline and/or isoquinoline and/or substituted derivatives thereof, the solvent being liquid at 25° C. These solutions are processed at temperatures above 170° C. and are used to produce shaped objects, such as films or fibers, or coatings. In addition they are used to determine the molecular weight of polyarylene sulfides or to purify polyarylene sulfides, or to clean apparatuses which were used in the production or processing of polyarylene sulfides.

7 Claims, No Drawings

POLYARYLENE SULFIDE SOLUTIONS, PROCESS FOR THE PREPARATION THEREOF AND USE THEREOF

Description

The present invention relates to polyarylene sulfide solutions, which have been prepared using a novel solvent, process for the preparation thereof and use thereof, especially in the production of shaped bodies or for cleaning and purification processes.

Polyarylene sulfides, such as polyphenylene sulfide (PPS), are known to be extremely poorly soluble polymer. The resistance to solvents of PPS, in particular to organic solvents at high temperatures, is one of the advantages conventionally asserted for this class of polymer. Thus, for example, reference is made in EP-A-398 094 to the fact that up to now no solvent for PPS has been disclosed which dissolves this polymer at temperatures of less than 200° C. In the "Handbook of Fiber Science and Technology, Vol. III, heading: High Technology Fibers, Marcel Dekker Inc., New York and Basel (1985), it is stated on p. 337 that PPS is not soluble in any known solvent below 200° C. This statement is confirmed in a number of other scientific works, for example in Journal of Applied Polymer Science, Vol. 32, pp. 3959-69 and pp. 4479-90 (1986).

The solvent conventionally used hitherto in industry for PPS is α-chloronaphthalene. Solutions may be prepared using this at temperatures above 200° C.

It is an object of the present invention to provide a solvent for polyarylene sulfides, using which solvent the preparation and processing of solutions can be carried out at as low a temperature as possible. Furthermore, the invention is to provide a solvent for polyarylene sulfides which, in comparison to the solvents used hitherto, is relatively easy to evaporate.

Such solutions are particularly desirable for a number of reasons. Thus, for example for processing reasons, it is generally preferred to process solutions for the production of shaped bodies at temperatures as low as possible.

Furthermore, it is necessary for a series of applications to eliminate the solvent after the processing. Obviously, this is easier to carry out, the more readily the solvent can be evaporated at a given temperature.

The present invention is based on the surprising finding that quinoline or derivatives thereof have an excellent dissolving capacity for polyarylene sulfides and that, using this solvent, stable solutions can be prepared even at temperatures below 200° C.

The present invention therefore relates to solutions containing polyarylene sulfide and, as solvent, quinoline and/or isoquinoline and/or substituted derivatives thereof, the solvent being liquid at 25° C., and the use of these solvents to dissolve polyarylene sulfide.

The solvent used can be a compound or a mixture of compounds, as long as this is liquid at 25° C.

The substituted derivatives of quinoline or isoquinoline are taken to mean all derivatives having some type of substituent, as long as these are liquid at 25° C. Examples of suitable substituents are hydroxyl, alkyl or alkoxy groups, such as methyl, ethyl, propyl, butyl, pentyl, hexyl or octyl or the corresponding alkoxy groups. Substituents are preferably methyl groups. Substituted quinolines or isoquinolines preferably have two substituents or, very particularly preferably, have one substituent.

Polyarylene sulfides are taken to mean quite generally polymers which have repeating structural units of the —Ar—S— type, where Ar can be any aromatic radical, for example a naphthalene radical or in particular a phenylene radical.

Polyphenylene sulfides (PPS) can be, for example, poly m-phenylene sulfides or, preferably, poly p-phenylene sulfides. The different repeating structural units can also be arranged as blocks. The polyphenylene sulfides can possibly be slightly branched. Preferably, polyphenylene sulfide is essentially linear polyphenylene sulfide.

The polyphenylene sulfide (PPS) is particularly an essentially linear PPS which has a melt viscosity of 50 to 1000 mPa*s, measured at 300° C., and a shear rate of 200 sec$^{-1}$.

The polyphenylene sulfide (PPS) is very particularly preferably a mixture of high molecular weight and low molecular weight PPS types, such as are disclosed, for example, in EP-A-407 887. The high molecular weight PPS types in this case have, in particular, a melt flow index of at most 100 g/10 min, and the low molecular PPS types have in this case, in particular, a melt flow index of at least 120 g/10 min, the measurement being carried out at 315° C. in a Zwick rheometer at a ram load of 5 kg and a die diameter of 2.095 mm and a die length of 8 mm.

The solvent used is preferably quinoline, which is monosubstituted or disubstituted by a lower alkyl substituent, or, in particular, unsubstituted quinoline.

The solutions according to the invention contain —depending on the particular solution temperature —different amounts of dissolved polyarylene sulfide.

Preference is given to solutions which contain the dissolved polymer at a concentration of 0.2 to 1.2 % by weight, based on the solution, at a temperature of 170° C.

The solutions according to the invention are distinguished by the fact that they are still stable even at relatively low temperatures. The invention therefore preferably relates to solutions which have a temperature between 170 and 200° C.

The invention also relates to a process for preparing the solution according to the invention including the steps:
i) mixing a predetermined amount of polyarylene sulfide with a predetermined amount of quinoline and/or isoquinoline and/or substituted derivatives thereof as solvent, the solvent being liquid at 25° C.,
ii) heating the mixture to temperatures of at least 170° C., preferably above 200° C., so that at least some of the polymer dissolves in the said solvent, and
iii) if necessary, separating off any undissolved constituents of the polymer.

Generally, in step i), a suspension of the polyarylene sulfide is first prepared in the solvent, and by heating in step ii), at least some of the polymer is dissolved. The separation of any undissolved constituents can be carried out by methods known to those skilled in the art, for example by filtration of the hot solution.

To prepare the solutions, the polyarylene sulfide can be used in any desired form; in particular, forms are used in which the polyarylene sulfide has as large as possible a surface area to volume ratio, for example granules or powder.

The solution according to the invention is used to produce shaped bodies, in particular fibers, films and coatings to purify polyarylene sulfides, especially for the preparation of high-purity polyarylene sulfides, or to determine the molecular weight of polyarylene sulfides.

In this case, all customary methods for the molecular weight determination of polymers in solutions can be used, for example the determination of the solution viscosity in relation to concentration, light scattering, and changes in the boiling point or freezing point or of the osmotic pressure of the polymer solution. To prepare high-purity polyarylene sulfides all conventional purification processes of polymers can be used which make use of polymer solutions. Polyarylene sulfide can, for example, be purified by recrystallization, hot filtration preferably preceding this process.

The invention also relates to the use of the solution for these purposes.

The production of shaped bodies using the solution according to the invention can be carried out by dry or wet shaping processes.

The invention therefore also relates to dry shaping processes for the production of films and, in particular, of fibers made of polyarylene sulfides including the steps a1) producing a solution as defined above, b1) extruding the said solution at temperatures above 170° C. through a spinneret, which contains orifices in a predetermined number and predetermined shape, so that the desired shaped body results, and c1) evaporating the solvent by the use of elevated temperature, so that a low-solvent shaped body results which has a mechanical stability and freedom from tackiness sufficient for further processing.

The invention therefore also relates to wet shaping processes for the production of films and, in particular, of fibers made of polyarylene sulfides including the steps:

a2) producing a solution as defined above, b2) extruding the said solution at temperatures above 170° C. through a spinneret which contains orifices in a predetermined number and in a predetermined shape so that a primary shaped body results, and c2) introducing this shaped body into a bath containing a coagulation liquid so that the solvent is eliminated from the said primary shaped body and the desired primary shaped body results by coagulation of the primary body which has sufficient mechanical stability for further processing.

In addition to these processes for the production of shaped bodies, the solutions according to the invention can be advantageously used to produce coatings. The invention therefore also relates to such a process including the steps:

a3) producing a solution as defined above, b3) applying the said solution at temperatures of at least 170° C. to a substrate with the formation of a film of the said solution on the said substrate, and c3) eliminating the solvent from the said film using elevated temperature and/or application of reduced pressure.

The shaped bodies and coatings obtainable by the above process are an additional object of the present invention.

These products have outstanding transparency.

It has furthermore been found that the solvents according to the invention can be used to clean apparatuses which had been used in the production or processing of polyarylene sulfide. These can be entire apparatuses or parts thereof. Such apparatuses, following their correct use, conventionally have residues of polyarylene sulfide, possibly in combination with other additives, which must be removed prior to reuse of these apparatuses. Burning out, conventionally used, can only be carried out with difficulty on apparatuses having polyarylene sulfide contaminations, in particular if these are to be burned out together with apparatuses which have been used to produce or process other polymers, such as polyesters. Burning out polyarylene sulfide-containing residues produces corrosive gases, which can have a disadvantageous action on the metal components. The cleaning difficulties of apparatuses contaminated with polyarylene sulfide make the product very difficult to handle.

It has now been shown that using the solvent according to the invention, a simple and gentle type of cleaning of polyarylene sulfide-contaminated apparatuses is possible.

For example, if PPS-contaminated apparatus components are boiled with quinoline in a metal pot having flange closure for two to fours under reflux and the pot is cooled to room temperature prior to opening, spinnerets, for example, having completely open spinneret holes can be obtained. Prior to touching the cleaned parts with unprotected hands, it is recommended to rinse off the quinoline-wet parts with a further low-boiling organic solvent, for example acetone. The cleaning is expediently supported by the use of ultrasound to increase still further the cleaning rate.

The solvent or solvent mixture can be separated off from the PPS precipitated at room temperature, for example by filtration. The solvent is preferably reused for this purpose following any necessary purification.

In a further embodiment of the cleaning process according to the invention, both the solvent and the PPS dissolved therein were reused. For the purpose, the solution is preferably purified, for example by hot filtration, and the PPS precipitated after cooling off is separated from the solvent.

The apparatus to be cleaned according to the invention is in particular equipment components which are used in processing of polyarylene sulfide and come into contact with this.

These are in particular equipment components from spinning apparatuses or devices for subsequent treatment of filaments, such as spinnerets, filtration devices, spin pump components, godets or thread guides.

These are furthermore apparatuses which are used in other shaping processes for polyarylene sulfide, such as in producing films or injection molded articles, for example extruders or extruder components, such as extruder screws, or injection molds.

The following examples describe the invention without restricting it thereto.

EXAMPLE 1

Preparation of PPS solutions Different amounts of poly p-phenylene sulfide of various molecular weights are weighed out in quinoline and dissolved at temperatures of 210° to 220° C. In the course of a dissolution time of 20 to 30 minutes, clear solutions are prepared in this manner having the PPS concentrations below (each at 170° C.):

Solution 1: 1.2 g/dl,
Solution 2: 0.9 g/dl,
Solution 3: 0.75 g/dl,
Solution 4: 0.5 g/dl, and
Solution 5: 0.2 g/dl.

EXAMPLE 2

Determination of the molecular weight and structural properties of PPS solutions by solution viscometry The viscosity of the solutions obtained according to Example 1 is determined by means of an Ubbelohde I capillary viscometer (type 53010) at a measurement temperature of 180° C. A so-called limit viscosity is determined from the plot of the viscosity values against the varying polymer concentration of the measurement solutions and the extrapolation to concentration of 0 g/dl.

EXAMPLE 3

Production of coatings using PPS solutions in quinoline

By dissolving PPS in quinoline at 230° C., clear solutions can be prepared up to a concentration of 5 g/dl. If such solutions are poured into appropriately hot molds, for example a glass dish, amorphous, transparent films are produced by evaporation under reduced pressure (<10 mmHg) at temperatures of 200° to 230° C. Highly precise spectroscopic studies, such as IR spectroscopic analyses, can be carried out on such films.

I claim: Patent claims

1. A solution containing polyarylene sulfide and, as solvent, quinoline or isoquinoline or a substituted derivative thereof or a mixture thereof, the solvent being liquid at 25° C.

2. The solution as claimed in claim 1, wherein the polyarylene sulfide is polyphenylene sulfide (PPS).

3. The solution as claimed in claim 1, wherein the solvent is quinoline monosubstituted or disubstituted by a lower alkyl substituent or unsubstituted quinoline.

4. The solution as claimed in claim 1, wherein the polyarylene sulfide is dissolved in the solvent in sufficient amount to be present at a concentration of 0.2 to 1.2% by weight, based on the solution, at a temperature of 170° C.

5. The solution as claimed in claim 1, wherein the solution has a temperature of between 170° and 200° C.

6. The solution as claimed in claim 2, wherein the polyphenylene sulfide (PPS) is an essentially linear PPS which has a melt viscosity of 50 to 1000 mPa*s, measured at 300° C., and a shear rate of 200 sec$^{-1}$.

7. The solution as claimed in claim 2, wherein the polyphenylene sulfide (PPS) comprises a mixture of two essentially linear PPS types, of which one PPS type has a melt flow index of at most 100 g/10 min, and the other PPS type has a melt flow index of at least 120 g/10 min, the measurement being carried out at 315° C. at a ram load of 5 kg and a die diameter of 2.095 mm and a die length of 8 mm.

* * * * *